US010612530B2

(12) United States Patent
Hayashi et al.

(10) Patent No.: US 10,612,530 B2
(45) Date of Patent: Apr. 7, 2020

(54) BENT-AXIS HYDRAULIC PUMP MOTOR

(71) Applicant: Komatsu Ltd., Tokyo (JP)

(72) Inventors: Seita Hayashi, Oyama (JP); Takuya Miyata, Oyama (JP)

(73) Assignee: Komatsu Ltd., Tokyo (JP)

( * ) Notice: Subject to any disclaimer, the term of this patent is extended or adjusted under 35 U.S.C. 154(b) by 221 days.

(21) Appl. No.: 15/756,228

(22) PCT Filed: Sep. 30, 2015

(86) PCT No.: PCT/JP2015/077846
§ 371 (c)(1),
(2) Date: Feb. 28, 2018

(87) PCT Pub. No.: WO2017/056272
PCT Pub. Date: Apr. 6, 2017

(65) Prior Publication Data
US 2018/0252271 A1 Sep. 6, 2018

(51) Int. Cl.
*F04B 1/24* (2006.01)
*F03C 1/06* (2006.01)
(Continued)

(52) U.S. Cl.
CPC .............. *F04B 1/24* (2013.01); *F03C 1/0642* (2013.01); *F16D 3/224* (2013.01); *F16D 3/2245* (2013.01);
(Continued)

(58) Field of Classification Search
CPC .......... F03C 1/0642; F04B 1/24; F16D 3/224; F16D 3/2245; F16D 3/24;
(Continued)

(56) References Cited

U.S. PATENT DOCUMENTS 3,198,131 A * 8/1965 Oswald Thoma .... F01B 3/0073
91/489
4,466,338 A * 8/1984 Stoelzer ................ F04B 1/2092
91/506
(Continued)

FOREIGN PATENT DOCUMENTS

CN 203035796 U 7/2013
CN 104153960 A 11/2014
(Continued)

OTHER PUBLICATIONS

International Search Report dated Dec. 28, 2015, issued for PCT/JP2015/077846.

*Primary Examiner* — Patrick Hamo
*Assistant Examiner* — Joseph S. Herrmann
(74) *Attorney, Agent, or Firm* — Locke Lord LLP

(57) ABSTRACT

A bent-axis hydraulic pump motor includes: a cylinder block, a retainer plate; and a constant velocity joint, which includes an inner joint element; an outer joint element; and a plurality of balls interposed between block-side ball grooves and shaft-side ball grooves to transmit torque between the cylinder block and the retainer plate, so that all block-side groove planes, which include respective extending axial lines of the block-side ball grooves and the inclined rotation center, are inclined with respect to an axial center of a center shaft and all drive shaft-side groove planes, which include respective extending axial lines of the shaft-side ball grooves and the inclined rotation center, are inclined with respect to an axial center of a drive shaft such that loads applied to a cage in an axial direction from the balls are balanced.

7 Claims, 7 Drawing Sheets

(51) Int. Cl.
  *F16D 3/224*   (2011.01)
  *F16D 3/2245*  (2011.01)
  *F16D 3/24*    (2006.01)
  *F01B 3/00*    (2006.01)
  *F16D 3/223*   (2011.01)

(52) U.S. Cl.
  CPC .............. *F16D 3/24* (2013.01); *F01B 3/0076* (2013.01); *F16D 2003/22303* (2013.01); *F16D 2003/22309* (2013.01); *F16D 2300/10* (2013.01)

(58) Field of Classification Search
  CPC . F16D 2003/22303; F16D 2003/22309; F16D 2300/10; F01B 3/0076
  See application file for complete search history.

(56) References Cited

U.S. PATENT DOCUMENTS

| | | | | |
|---|---|---|---|---|
| 4,617,853 A | * | 10/1986 | Wagenseil | F04B 1/328 417/222.1 |
| 5,182,978 A | * | 2/1993 | Akasaka | F04B 1/2085 91/499 |
| 6,227,979 B1 | | 5/2001 | Yamamoto et al. | |
| 6,405,835 B1 | * | 6/2002 | Satou | B60T 1/065 188/170 |
| 8,273,188 B2 | * | 9/2012 | Yoshida | C21D 1/06 148/226 |
| 9,816,565 B2 | * | 11/2017 | Yoshida | F16D 3/223 |
| 2015/0030471 A1 | | 1/2015 | Miyata et al. | |
| 2015/0204386 A1 | | 7/2015 | Yoshida et al. | |

FOREIGN PATENT DOCUMENTS

| | | | |
|---|---|---|---|
| CN | 104508310 A | | 4/2015 |
| JP | 11-325096 A | | 11/1999 |
| JP | 2001-241376 A | | 9/2001 |
| JP | 2001-587077 | * | 9/2001 |
| JP | 2009-250365 A | | 10/2009 |
| JP | 2013-133919 A | | 7/2013 |
| JP | 2013-221431 A | | 10/2013 |
| JP | 2014-043943 A | | 3/2014 |

* cited by examiner (a)

(b)

BENT-AXIS HYDRAULIC PUMP MOTOR

FIELD

The present disclosure relates to a bent-axis hydraulic pump motor.

BACKGROUND

In the bent-axis hydraulic pump motor in which a stroke distance of a piston rod is changed by changing an inclination angle (inclined rotation angle) of an axial center of a cylinder block with respect to an axial center of a drive shaft, there has been a technique of connecting the cylinder block to a retainer plate of the drive shaft by using a constant velocity joint as a mechanism to synchronously rotate the cylinder block and the drive shaft. The constant velocity joint is, for example, a component in which a plurality of balls held in a cage is disposed between a sphere-shaped inner joint element provided at one end portion of a cylinder block and a cylindrical recessed portion provided at a retainer plate serving as an outer joint element, and the cylinder block and the retainer plate are connected by interposing the balls between ball grooves of the inner joint element and ball grooves of the outer joint element.

To form a constant velocity joint between a cylinder block and a retainer plate, all of balls are needed to be disposed at positions on a bisecting plane relative to an inclined rotation angle between the cylinder block and the drive shaft. Therefore, in the related art, setting is made such that a cage is kept on a bisecting plane of an inclined rotation angle between a cylinder block and a drive shaft by: offsetting a center of a sliding contact surface between the cage and an inner joint element and a center of a sliding contact surface between the cage and a retainer plate in opposite directions along an axial direction of the drive shaft with respect to an intersection (inclined rotation center) between the axial center of the cylinder block and the axial center of the drive shaft; and balancing loads applied to the cage (refer to Patent Literature 1).

However, according to the technology in which the centers of the sliding contact surfaces between the cage and the cylinder block and between the cage and the retainer plate are offset with respect to the inclined rotation center between the cylinder block and the drive shaft, an unnecessary rotational moment is applied to the cylinder block in a case where the cylinder block is rotated. As a result, the cylinder block may be displaced with respect to a valve plate.

Furthermore, according to the structure of Patent Literature 1, heat is generated from the sliding surface because the cage is pressed against the retainer plate by couple generated at the cage during torque transmission, thereby preventing speed increase.

On the other hand, as a constant velocity joint, there has been provided a technology in which a ball groove of an inner joint element and a ball groove of an outer joint element are formed such that a plane including an extending axial line of each ball groove and an inclined rotation center is inclined with respect to an axial center. According to this constant velocity joint, loads applied to a cage from balls can be balanced in the axial direction, and therefore, the cage can be kept at a position on a bisecting plane of an inclined rotation angle between two members without offsetting centers of respective sliding contact surfaces with respect to an inclined rotation center between the two members (refer to Patent Literature 2, for example).

CITATION LIST

Patent Literature

Patent Literature 1: Japanese Laid-open Patent Publication No. 2001-241376
Patent Literature 2: Japanese Laid-open Patent Publication No. 2009-250365

SUMMARY

Technical Problem

Incidentally, there are many cases where the number of piston rods is normally set to an odd number in order to prevent pressure pulsation in a bent-axis hydraulic pump motor. Furthermore, the number of balls interposed between a cylinder block and a retainer plate is needed to be the same as the number of piston rods in order to prevent undulation in torque transmission between the cylinder block and the drive shaft.

As described in Patent Literature 2, according to a general constant velocity joint, the number of balls is set to an even number such as six or eight. Therefore, in a case where a bent-axis hydraulic pump motor having seven piston rods is applied, and six planes each including an extending axial line of a ball groove provided at an inner joint element and an inclined rotation center and six planes each including an extending axial line of a ball groove provided at an outer joint element and the inclined rotation center are inclined with respect to an axial center of the cylinder block, an inclined rotation angle of the cage is to be kept at a position on a bisecting plane relative to the inclined rotation angle between the cylinder block and the drive shaft without offsetting centers of sliding contact surfaces between the cage and the cylinder block and between the cage and a retainer plate with respect to the inclined rotation center between the cylinder block and the drive shaft.

However, even though the six planes each including the extending axial line of the ball groove provided at the inner joint element and the inclined rotation center and the six plane each including the extending axial line of the ball groove provided at the outer joint element and the inclined rotation center are inclined, an actual situation is that heat is still generated from a sliding surface between the cage and the inner joint element or between the cage and the outer joint element, and it is still difficult to increase a speed.

The present disclosure is made in view of the above-described situation and directed to providing a bent-axis hydraulic pump motor in which a high-speed rotation of a cylinder block can be achieved.

Solution to Problem

To attain the above object, a bent-axis hydraulic pump motor according to the present disclosure includes: a cylinder block having a center shaft at a position to be an axial center on one end surface, and also having odd number of cylinder bores which are open along a circumference around the axial center on the one end surface; a retainer plate inclinably supporting the center shaft to an end surface of a drive shaft; and a constant velocity joint connecting the center shaft to the retainer plate, in which in a case where the drive shaft and the cylinder block are rotated around respective axial centers via the constant velocity joint, a piston rod disposed in each of the cylinder bore is moved at a stroke in accordance with an inclination angle around an inclined rotation center between the drive shaft and the cylinder block. Further, the constant velocity joint includes: an inner joint element formed at a support end portion of the center shaft, and having an outer surface on which a number of block-side ball grooves corresponding to a number of the cylinder bores are arranged together along a circumferential direction around an axial center of the center shaft; an outer joint element formed on the retainer plate at a region facing the support end portion of the center shaft, and having an inner surface on which shaft-side ball grooves corresponding to the block-side ball grooves are arranged together along a circumferential direction around an axial center of the drive shaft; a plurality of balls interposed between the block-side ball grooves and the shaft-side ball grooves corresponding to each other, and configured to transmit torque between the cylinder block and the retainer plate; and a cage disposed between the inner joint element and the outer joint element and having ball holes configured to house the respective balls in a state in which movement of the balls in the axial direction of the center shaft is regulated. Further, all block-side groove planes, which include respective extending axial lines of the block-side ball grooves and the inclined rotation center, are inclined with respect to the axial center of the center shaft and all drive shaft-side groove planes, which include respective extending axial lines of the shaft-side ball grooves and the inclined rotation center, are inclined with respect to the axial center of the drive shaft such that loads applied to the cage in an axial direction from the balls are balanced.

Further, according to the present disclosure, in the above bent-axis hydraulic pump motor, the block-side groove planes adjacent to each other in the circumferential direction are inclined in directions opposite to each other with respect to an axial center except for one pair, the drive shaft-side groove planes adjacent to each other in the circumferential direction are inclined in directions opposite to each other with respect to an axial center except for one pair, and a block-side groove plane and a drive shaft-side groove plane corresponding to each other are inclined in directions opposite to each other with respect to an axial center.

Further, according to the present disclosure, in the above bent-axis hydraulic pump motor, the block-side groove planes and the drive shaft-side groove planes are formed such that inclination angles of those inclined to one side with respect to an axial center are equal to each other, and inclination angles of those inclined to another side with respect to an axial center are equal to each other.

Further, according to the present disclosure, in the above bent-axis hydraulic pump motor, the outer surface of the inner joint element and the inner surface of the outer joint element are each formed in a spherical shape centering the inclined rotation center, and a curvature center of the block-side ball groove and a curvature center of the shaft-side ball groove are aligned with the inclined rotation center.

Further, according to the present disclosure, in the above bent-axis hydraulic pump motor, the center shaft and the cylinder block are formed separately, and a shaft attachment hole is formed in the cylinder block, and the center shaft is attached to the shaft attachment hole in a state in which the support end portion protrudes from the one end surface.

Further, according to the present disclosure, the above bent-axis hydraulic pump motor further includes a valve plate interposed between another end surface of the cylinder block and a casing, and configured to perform pressure switch control for each of the cylinder bores in accordance with a rotational position of the cylinder block by slidably contacting the cylinder block in a rotatable manner. Further, the valve plate contacts the another end surface via a spherical surface having a center on extension of the axial center of the cylinder block.

Further, a bent-axis hydraulic pump motor according to the present disclosure includes: a cylinder block having a center shaft at a position to be an axial center on one end surface, and also having odd number of cylinder bores which are open along a circumference around the axial center on the one end surface; a retainer plate inclinably supporting the center shaft to an end surface of a drive shaft; and a constant velocity joint connecting the center shaft to the retainer plate, in which in a case where the drive shaft and the cylinder block are rotated around respective axial centers via the constant velocity joint, a piston rod disposed in each of the cylinder bore is moved at a stroke in accordance with an inclination angle around an inclined rotation center between the drive shaft and the cylinder block. Further, the constant velocity joint includes: an inner joint element formed at a support end portion of the center shaft, and having an outer surface on which a number of block-side ball grooves corresponding to a number of the cylinder bores are arranged in together along a circumferential direction around an axial center of the center shaft; an outer joint element formed on the retainer plate at a region facing the support end portion of the center shaft, and having an inner surface on which shaft-side ball grooves respectively corresponding to the block-side ball grooves are arranged in parallel in a circumferential direction centering an axial center of the drive shaft; a plurality of balls interposed between the block-side ball grooves and the shaft-side ball grooves corresponding to each other, and configured to transmit torque between the cylinder block and the retainer plate; and a cage disposed between the inner joint element and the outer joint element and having ball holes configured to house the respective balls in a state in which movement of the balls in the axial direction of the center shaft is regulated. Further, all block-side groove planes, which include respective extending axial lines of the block-side ball grooves and the inclined rotation center, are inclined with respect to the axial center of the center shaft and all drive shaft-side groove planes, which include respective extending axial lines of the shaft-side ball grooves and the inclined rotation center, are inclined with respect to the axial center of the drive shaft such that rotational moments caused by loads applied to the cage from the balls, namely, rotational moments around two axes orthogonal to an axial center of the cage and passing the inclined rotation center are balanced.

Advantageous Effects of Invention

According to the present disclosure, each block-side groove plane including the extending axial line of the block-side ball groove and the inclined rotation center and each drive shaft-side groove plane including the extending axial line of the shaft-side ball groove and the inclined rotation center is inclined with respect to the axial center, and therefore, all of the balls apply the loads to the cage. Therefore, an imbalance of the loads applied to the cage and an imbalance of the rotational moments are reduced, and heat generation at a sliding portion between the cage and the inner joint element or between the cage and the outer joint element is suppressed, and therefore, high-speed rotation of a pump motor can be achieved.

DESCRIPTION OF EMBODIMENTS

In the following, preferable embodiments of a bent-axis hydraulic pump motor according to the present disclosure will be described in detail with reference to the accompanying drawings.

First Embodiment

Figure 1:
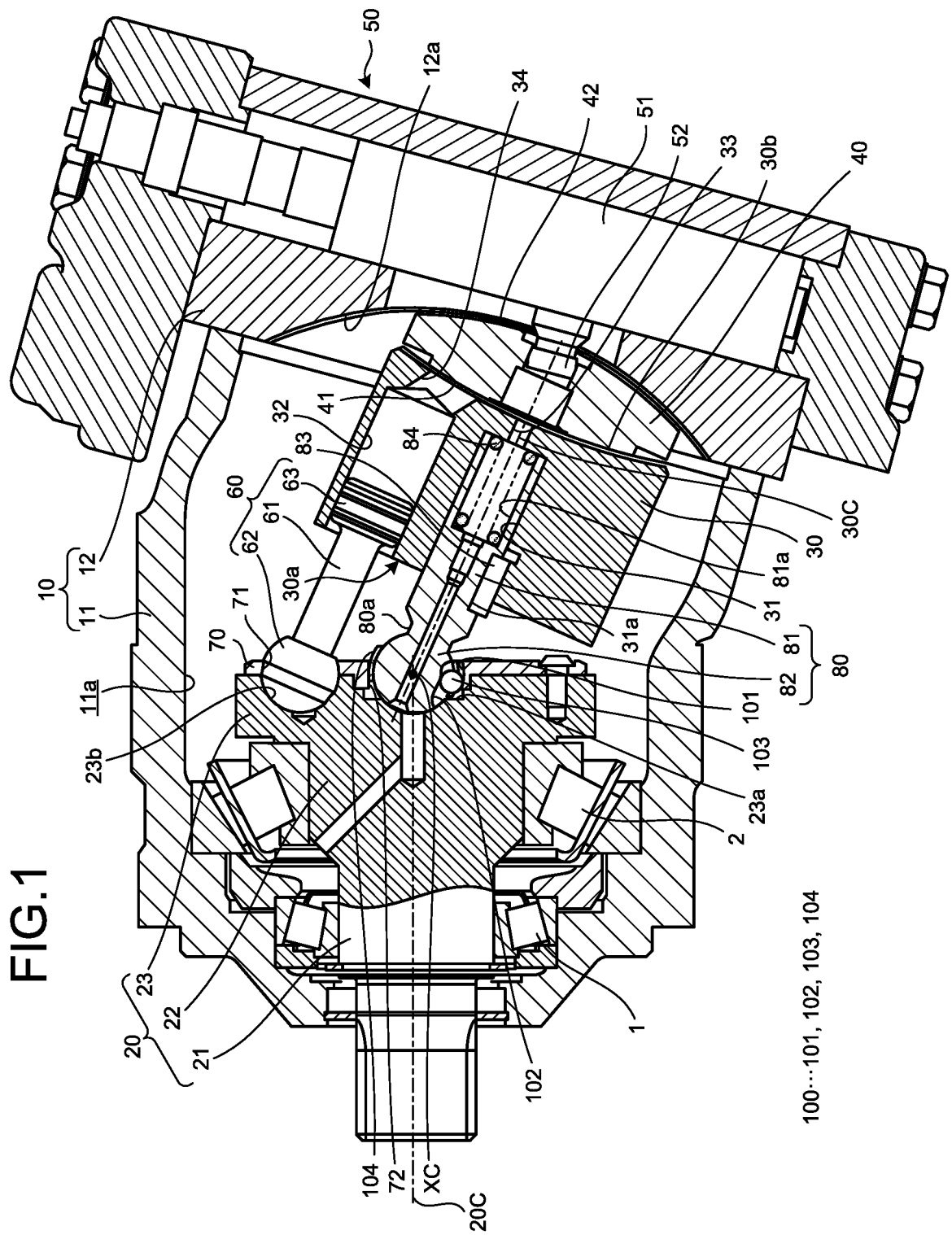
FIG. 1 is a cross-sectional view of a bent-axis hydraulic pump motor according to a first embodiment of the present disclosure.

FIG. 1 illustrates a bent-axis hydraulic pump motor according to a first embodiment of the present disclosure. The bent-axis hydraulic pump motor exemplified here is used as a travel hydraulic motor of a vehicle used as a construction machine such as a wheel loader, and includes a casing 10. The casing 10 includes: a casing main body 11 having a hollow shape in which one end is open; and a guide plate 12 attached to the one end portion of the casing main body 11 so as to close the opening of the casing main body 11, in which a hollow inner portion 11a of the casing main body 11 houses a drive shaft 20 and a cylinder block 30.

The drive shaft 20 has: a second bearing support portion 22 having a large diameter at one end portion of a first bearing support portion 21 formed in a columnar shape; and a disk portion 23 located at one end portion of the second bearing support portion 22 and formed in a disk-like shape having a large diameter. The drive shaft 20 is supported by the casing main body 11 via the first bearing support portion 21 and the second bearing support portion 22 in a state in which the disk portion 23 is positioned in the hollow inner portion 11a of the casing main body 11. More specifically, a first tapered roller bearing 1 is provided between the first bearing support portion 21 of the drive shaft 20 and the casing main body 11, and a second tapered roller bearing 2 is provided between the second bearing support portion 22 of the drive shaft 20 and the casing main body 11. The drive shaft 20 can be rotated around an own axial center 20C with respect to the casing main body 11 by the first tapered roller bearing 1 and the second tapered roller bearing 2.

The disk portion 23 of the drive shaft 20 has an end surface provided with a shaft housing portion 23a and a plurality of rod support portions 23b. The shaft housing portion 23a and the rod support portion 23b are recessed portions open at an end surface of the disk portion 23. The shaft housing portion 23a is solely formed in the disk portion 23 at a position on the axial center 20C of the drive shaft 20. Although not illustrated in the drawing, the rod support portions 23b are provided at seven positions equally spaced from each other on a common circumference centering the axial center 20C of the drive shaft 20.

The cylinder block 30 is a columnar member having a circular cross section orthogonal to an axial center 30C and also having one end surface 30a formed as a plane orthogonal to the axial center 30C. A shaft attachment hole 31 and a plurality of cylinder bores 32 are provided in this cylinder block 30. The shaft attachment hole 31 and the cylinder bore 32 are void spaces formed in parallel to the axial center 30C of the cylinder block 30. Each of these shaft attachment holes 31 and cylinder bore 32 has a circular cross section orthogonal to each axial center, and is open at the one end surface 30a of the cylinder block 30. The shaft attachment hole 31 is solely formed at a position on the axial center 30C of the cylinder block 30. Although not illustrated in the drawing, the cylinder bores 32 are arranged at seven positions equally spaced from each other on a common circumference centering the axial center 30C of the cylinder block 30. The circumference where the cylinder bores 32 are provided has a dimension same as the circumference where the rod support portions 23b are provided in the disk portion 23 of the drive shaft 20.

The cylinder block 30 has the other end where an alignment recessed surface (the other end surface) 30b is formed. Although not illustrated in the drawing, the alignment recessed surface 30b of the cylinder block 30 is formed in a spherical shape having a center located on an extension of the axial center 30C of the cylinder block 30. A communication hole 33 and a plurality of communication paths 34 are open at the alignment recessed surface 30b of the cylinder block 30. The communication hole 33 is an opening solely provided at a position on the axial center 30C of the cylinder block 30, and communicates with the shaft attachment hole 31. The communication hole 33 has an inner diameter formed smaller than an inner diameter of the shaft attachment hole 31. Although not illustrated in the drawing, the communication paths 34 are open on the circumference centering the axial center 30C of the cylinder block 30 and arranged at seven positions equally spaced from each other. A radius of the circumference on which the communication paths 34 are open is set to a value smaller than the circumference on which the cylinder bores 32 are open. Each of the communication paths 34 has an inner diameter smaller than that of the cylinder bore 32, and communicates with each of the cylinder bores 32.

A valve plate 40 is disposed between the alignment recessed surface 30b of the cylinder block 30 and the guide plate 12 of the casing 10. The valve plate 40 has a sliding protruding spherical surface 41 and a sliding protruding cylindrical surface 42, and slidably contacts the alignment recessed surface 30b of the cylinder block 30 via the sliding protruding spherical surface 41 and also slidably contacts a guide surface 12a of the guide plate 12 via the sliding protruding cylindrical surface 42. The sliding protruding spherical surface 41 is a portion that has a curvature radius same as that of the alignment recessed surface 30b of the cylinder block 30 and spherically protrudes, and can slide in a state tightly contacting the alignment recessed surface 30b of the cylinder block 30. The sliding protruding cylindrical surface 42 is a cylindrical surface that protrudes from a surface opposite to the sliding protruding spherical surface 41.

The guide surface 12a of the guide plate 12 that the sliding protruding cylindrical surface 42 contacts has a curvature radius same as that of the sliding protruding cylindrical surface 42, also is a recessed cylindrical surface having an arc length larger than that of the sliding protruding cylindrical surface 42, and further is formed at a region facing the disk portion 23 of the drive shaft 20. The guide surface 12a of the guide plate 12 is orthogonal to the axial center 20C of the drive shaft 20 and a position thereof is set such that a line positioned on the end surface of the disk portion 23 becomes a center axis L of the cylinder.

Meanwhile, a reference sign 50 in FIG. 1 indicates an actuator in order to move the valve plate 40 along the guide surface 12a of the guide plate 12. In this actuator 50, an actuator piston 51 serving as an output element is engaged with the valve plate 40 via a link pin 52 in an inclinable manner.

Although not illustrated in the drawing, a high pressure port and a low pressure port are open at the sliding protruding spherical surface 41 of the valve plate 40 at regions corresponding to the communication paths 34 of the cylinder block 30. These high pressure port and low pressure port are selectively connected to the respective cylinder bores 32 via the communication paths 34 in a case where the cylinder block 30 is rotated around the axial center 30C. More specifically, a high pressure port is provided on one side of a virtual plane including the axial center 20C of the drive shaft 20 and orthogonal to the center axis L of the guide surface 12a provided on the guide plate 12, also a low pressure port is provided on the other side, and a cylinder bore 32 arranged on the one side of the virtual plane is connected to the high pressure port, and a cylinder bore 32 arranged on the other side is connected to the low pressure port.

On the other hand, a piston rod 60 is disposed in each of the cylinder bores 32 in the cylinder block 30. The piston rod 60 has a support portion 62 at a proximal end portion of a rod shaft portion 61 and a piston portion 63 at a distal end portion of the rod shaft portion 61, and is slidably inserted into the cylinder bore 32 via the piston portion 63. The support portion 62 of the piston rod 60 is formed in a spherical shape having an outer diameter that can be slidably inserted into the rod support portion 23b formed in the disk portion 23 of the drive shaft 20. Each of the piston rods 60 has a length larger than a dimension in a direction along the axial center 30C of the cylinder block 30, and even in a case where the piston portion 63 enters a deepest position of the cylinder bore 32, the support portion 62 is kept in a state protruding outside from the one end surface 30a of the cylinder block 30.

A retainer plate 70 is fixed to the end surface of the disk portion 23 after the respective support portions 62 are attached to the rod support portions 23b formed on the disk portion 23 of the drive shaft 20, and therefore, the plurality of piston rods 60 is inclinably supported relative to the end surface of the disk portion 23 in a state that separating movement of the respective support portions 62 from the end surface of the disk portion 23 is regulated.

Figure 2:
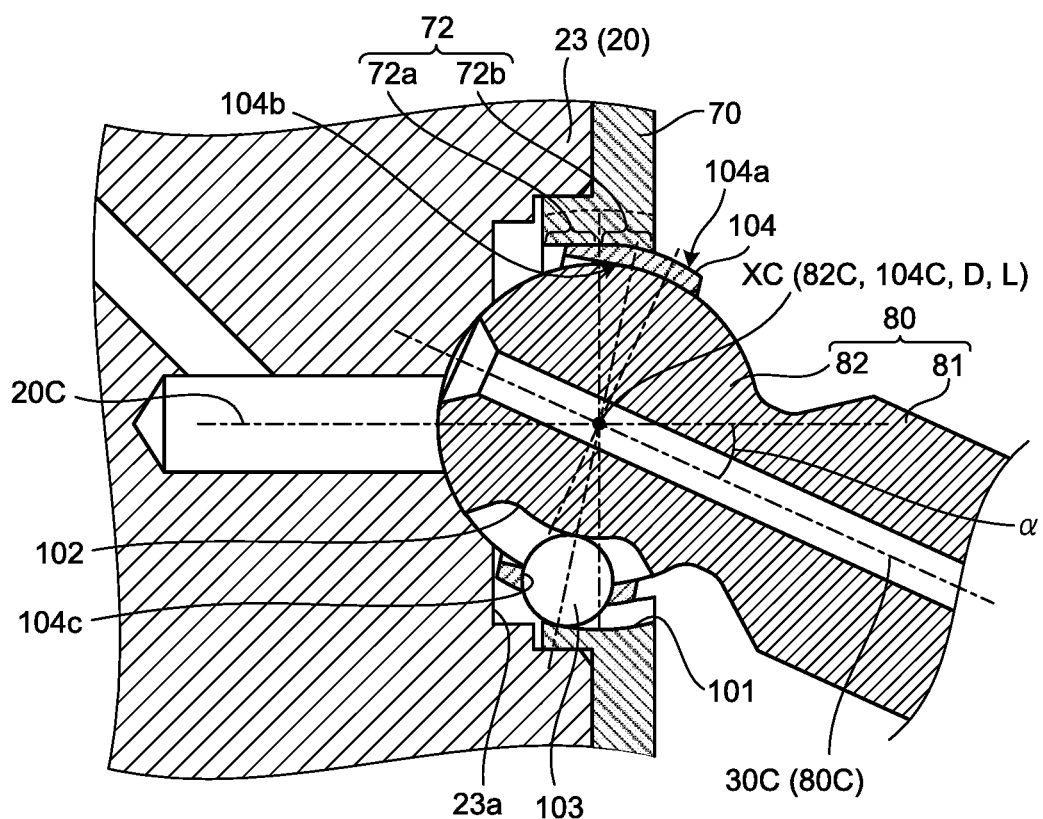
FIG. 2 is an enlarged view of a main portion of the bent-axis hydraulic pump motor illustrated in FIG. 1.
Figure 3:
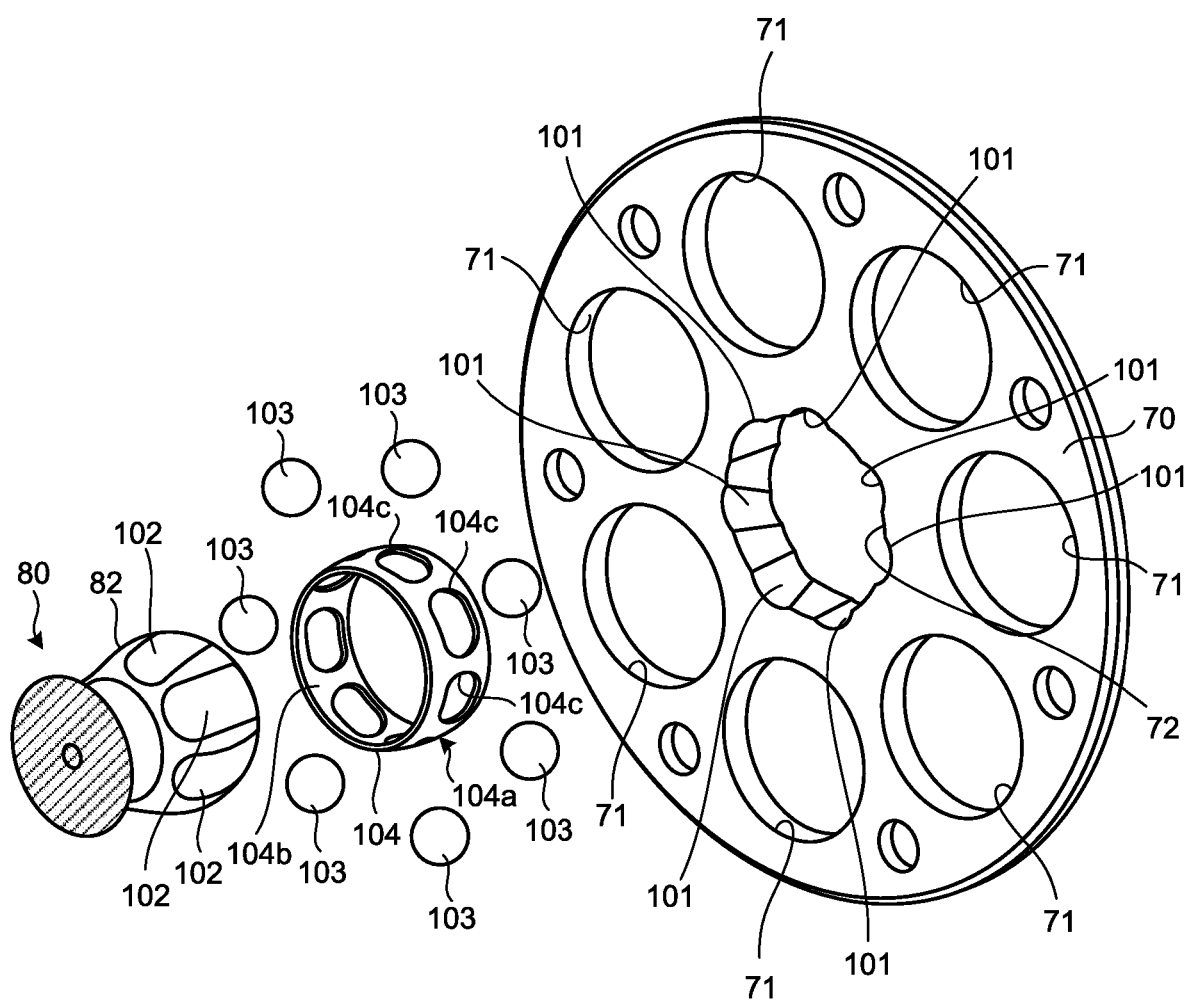
FIG. 3 is an exploded perspective view illustrating a structure of a constant velocity joint applied to the bent-axis hydraulic pump motor illustrated in FIG. 1.

As illustrated in FIGS. 1 and 3, the retainer plate 70 has a rod insertion hole 71 at a region corresponding to each of the rod support portions 23b of the disk portion 23, and also is a disk-shaped member having a shaft support hole (outer joint element) 72 at a region corresponding to the shaft housing portion 23a. The rod insertion hole 71 is a circular through hole formed to have an inner diameter smaller than that of the support portion 62 of the piston rod 60. Attachment of the retainer plate 70 to the end surface of the disk portion 23 is to be performed in a state in which each piston rod 60 is inserted into each rod insertion hole 71 in advance. The shaft support hole 72 has a structure through which a cylindrical portion protruding toward the shaft housing portion 23a of the disk portion 23 is passed. As is obvious from FIG. 2, the shaft support hole 72 is formed such that a portion 72a positioned closer to the shaft housing portion 23a side than a plane located on the end surface of the disk portion 23 is shaped in a cylindrical shape. On the other hand, a portion 72b positioned closer to the cylinder block 30 side than the plane located on the end surface of the disk portion 23 is formed in a spherical shape. More specifically, the spherical-shaped portion 72b of the shaft support hole 72 forms a spherical surface centering an intersection D between the axial center 20C of the drive shaft 20 and the end surface of the disk portion 23, and is formed to have an inner diameter gradually decreased toward the cylinder block 30.

Furthermore, as illustrated in FIGS. 1 and 2, a center shaft 80 is disposed between the cylinder block 30 and the disk portion 23 of the drive shaft 20. The center shaft 80 has a shaft base portion 81 formed in a columnar shape and a shaft support head portion (inner joint element) 82 provided at a proximal end portion of the shaft base portion 81, and is attached to the shaft attachment hole 31 of the cylinder block 30 via the shaft base portion 81 in a state in which axial centers of both portions are aligned, and furthermore, the center shaft 80 is attached to the shaft support hole 72 of the retainer plate 70 via the shaft support head portion 82.

The shaft base portion 81 is formed in a columnar shape having an outer diameter that can be attached to the shaft attachment hole 31 of the cylinder block 30 without rattling. A length in the axial direction of the shaft base portion 81 is formed longer than the shaft attachment hole 31 such that a part of the shaft base portion 81 protrudes outside in a case of being attached to the shaft attachment hole 31. The shaft base portion 81 is provided with a spring housing hole 81a at a region on the axial center, and further provided with a key member 83 on an outer peripheral surface. The spring housing hole 81a is a void space open at an end surface of the shaft base portion 81. The spring housing hole 81a has a circular-shaped cross section along a longitudinal direction and houses a pressing spring 84 inside thereof. The pressing spring 84 is a coil spring formed so as to have an outer diameter slightly smaller than an inner diameter of the spring housing hole 81a and have an entire length longer than that of the spring housing hole 81a in an unloaded state. The key member 83 is a rectangular parallelepiped member attached in a manner protruding from the outer peripheral surface of the shaft base portion 81, and is fitted into a key groove 31a provided on an inner peripheral surface of the shaft attachment hole 31, and further functions so as to transmit torque between the center shaft 80 and the cylinder block 30.

The shaft support head portion 82 is formed in a spherical shape having an outer diameter smaller than that of the shaft support hole 72 of the retainer plate 70. A small diameter portion 80a is provided between the shaft support head portion 82 and the shaft base portion 81 in order to avoid interference with the retainer plate 70 in a case where the center shaft 80 is inclined.

A constant velocity joint 100 is formed between the shaft support hole 72 of the retainer plate 70 and the shaft support head portion 82 of the center shaft 80. The constant velocity joint 100 transfers torque between the drive shaft 20 and the cylinder block 30 via the center shaft 80. In the first embodiment, the constant velocity joint 100 is formed by: forming a plurality of ball grooves 101 and 102 on an inner surface of the shaft support hole 72 and an outer surface of the shaft support head portion 82, respectively, in a manner corresponding to each other; also interposing balls 103 between the ball grooves 101 and 102 corresponding to each other; and further disposing a cage 104 between the shaft support hole 72 and the shaft support head portion 82.

The ball grooves of the shaft support hole 72 (hereinafter referred to as "shaft-side ball grooves 101") and the ball grooves of the shaft support head portion 82 (hereinafter referred to as "block-side ball grooves 102") are recessed grooves each having a transverse cross-section of a semicircular shape.

As illustrated in FIGS. 2 and 3, each shaft-side ball grooves 101 is open as a recessed groove linearly extending on the inner surface of the shaft support hole 72, and an inner bottom surface thereof in the extending direction is formed in an arc-shaped recessed surface centering the intersection D between the axial center 20C of the drive shaft 20 and the end surface of the disk portion 23, and the shaft-side ball grooves are provided at seven positions between the respective rod insertion holes 71. These shaft-side ball grooves 101 are arranged in parallel at equal intervals in a circumferential direction on a plane located at the end surface of the disk portion 23.

Each block-side ball grooves 102 is open as a recessed groove linearly extending on an outer surface of the shaft support head portion 82, and an inner bottom surface thereof in the extending direction is formed in an arc-shaped protruding surface centering a spherical center 82C of the shaft support head portion 82, and seven block-side ball grooves are provided corresponding to the shaft-side ball grooves 101. Each block-side ball groove 102 has a width same as a width of each shaft-side ball groove 101. These block-side ball grooves 102 are arranged in parallel at equal intervals in a circumferential direction on a plane orthogonal to the axial center 80C of the center shaft 80 and including the spherical center 82C of the shaft support head portion 82.

Each of the balls 103 has a spherical shape having an outer diameter that allows the ball to be arranged in a state fitted inside each of the shaft-side ball grooves 101 and each of the block-side ball grooves 102, and one ball 103 is provided between a shaft-side ball groove 101 and a block-side ball groove 102 corresponding to each other. These balls 103 roll in the shaft-side ball grooves 101 and the block-side ball grooves 102 and can move along the extending directions, respectively.

The cage 104 is an annular member having a spherical outer surface 104a that can contact the inner surface of a spherical-shaped portion of the shaft support hole 72, and also having a spherical inner surface 104b that can contact the outer surface of the shaft support head portion 82. Both of the outer surface 104a having the spherical shape and the inner surface 104b having the spherical shape of the cage 104 are formed centering an intersection 104C between an axial center of the cage 104 and a bisecting plane orthogonal to the axial center. Therefore, in a case of disposing the cage 104 between the shaft support hole 72 of the retainer plate 70 and the shaft support head portion 82 of the center shaft 80, the cylinder block 30 is connected in an inclinable manner relative to the drive shaft 20 in a state in which the spherical center 82C of the shaft support head portion 82 coincides with the intersection D between the axial center 20C of the drive shaft 20 and the end surface of the disk portion 23. In the following, the spherical center 82C of the shaft support head portion 82 and the intersection between the axial center 20C of the drive shaft 20 and the end surface of the disk portion 23, which coincide with each other, will be referred to as an inclined rotation center XC.

In the cage 104, seven ball holes 104c are provided in a circumferential direction. Each ball hole 104c is an opening to house a ball 103 in a state in which relative movement of the ball 103 in an axial direction of the cage 104 is regulated, and the ball holes 104c are arranged in parallel at equal intervals in a circumferential direction on the bisecting plane orthogonal to the axial center. In a case of arranging the balls 103 in the ball holes 104c of the cage 104 respectively, the seven balls 103 are arranged at positions at equal intervals in the circumferential direction on the bisecting plane orthogonal to the axial center of the cage 104.

Figure 4:
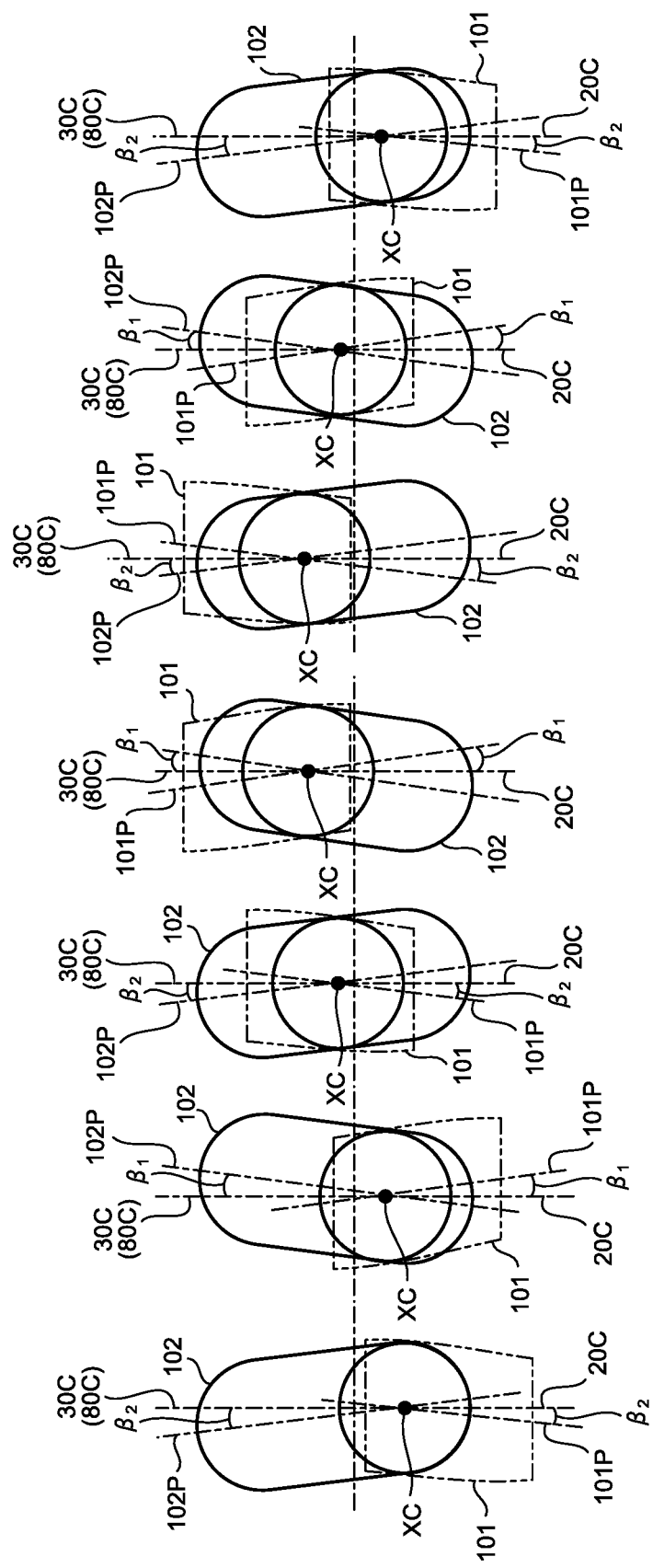
FIG. 4 is a diagram illustrating a relation between a block-side ball groove and a shaft-side ball groove in the constant velocity joint illustrated in FIG. 3 in a developed manner.

As illustrated in a developed view of FIG. 4, in this travel hydraulic motor, the shaft-side ball grooves 101 are provided such that each drive shaft-side groove plane 101P including an extending axial line of the shaft-side ball groove 101 and the inclined rotation center XC is inclined with respect to the axial center 20C of the drive shaft 20, and also the block-side ball grooves 102 are provided such that each block-side groove plane 102P including an extending axial line of the block-side ball groove 102 and inclined rotation center XC is inclined with respect to the axial center 80C of the center shaft 80.

More specifically, the block-side groove planes 102P adjacent to each other in the circumferential direction and the drive shaft-side groove planes 101P adjacent to each other in the circumferential direction are inclined in directions opposite to each other with respect to the axial centers 20C and 80C except for one pair. A block-side groove plane 102P and a drive shaft-side groove plane 101P corresponding to each other are inclined in directions opposite to each other with respect to the axial centers 20C and 800. As for an inclination angle of a block-side groove plane 102P and an inclination angle of a drive shaft-side groove plane 101P, those inclined in the same direction mutually have the same value, and in a case where the drive shaft 20 and the cylinder block 30 are rotated around the respective axial centers, the inclination angles are set that loads applied to the cage 104 in the axis direction of the cage 104 from the seven balls 103 are balanced. In other words, the inclination angle of the block-side groove plane 102P and the inclination angle of the drive shaft-side groove plane 101P are set such that the sum of the loads applied to the cage 104 from the balls 103 in the axis direction becomes zero. For example, the seven block-side ball grooves 102 and the seven shaft-side ball grooves 101 include three block-side groove planes 102P and three drive shaft-side groove planes 101P each having an inclination angle $\beta_1$, and four block-side groove planes 102P and four drive shaft-side groove planes 101P each having an inclination angle $\beta_2$ ($<\beta_1$), and the inclination angle $\beta_1$ and the inclination angle $\beta_2$ are set so as to satisfy $3 \times \tan \beta_1 = 4 \times \tan \beta_2$. More specifically, the inclination angle $\beta_1 = 7°\ 19'$, and the inclination angle $\beta_2 = 5°\ 30'$ are exemplified.

In the travel hydraulic motor having the above-described structure, in a case where an oil tank is connected to the low-pressure port while oil is supplied to the high pressure port, the piston rods 60 are sequentially moved in an advancing direction toward the drive shaft 20 in the cylinder bores 32 connected to the high pressure port while the piston rods 60 are sequentially moved in a retracting direction in the cylinder bores 32 connected to the low pressure port, and therefore, the cylinder block 30 is rotated and this hydraulic motor functions as a travel hydraulic motor using the drive shaft 20 as an output shaft. When a position of the valve plate 40 with respect to the guide surface 12a of the guide plate 12 is changed by driving the actuator 50, an inclined rotation angle α of the axial center 30C of the cylinder block 30 with respect to the axial center 20C of the drive shaft 20 is changed, and the travel hydraulic motor is operated in a state in which a stroke amount of the piston rod 60 relative to the cylinder bore 32, namely, a capacity is changed.

Here, according to this travel hydraulic motor, the drive shaft 20 and the cylinder block 30 are synchronously rotated via the constant velocity joint 100, and therefore, a rotational load applied to a slide contact portion between the piston rod 60 and the cylinder block 30 is reduced, and a problem like galling or seizure may hardly occur in the slide contact portion between the piston rod 60 and the cylinder block 30.

Furthermore, each shaft-side ball groove 101 and each block-side ball groove 102 has an arc shape centering the inclined rotation center XC, and also the cage 104 interposed between the shaft support hole 72 of the retainer plate 70 and the shaft support head portion 82 of the center shaft 80 is formed such that both of the spherical-shaped outer surface 104a and the spherical-shaped inner surface 104b are formed centering the intersection (=inclined rotation center XC) between the axial center of the cage 104 and the bisecting plane orthogonal to the axial center. Therefore, in the case where the cylinder block 30 is rotated, an unnecessary rotational moment is prevented from being applied to the cylinder block 30.

Furthermore, each block-side groove plane 102P including the extending axial line of the block-side ball groove 102 and the inclined rotation center XC and each drive shaft-side groove plane 101P including the extending axial line of the shaft-side ball groove 101 and the inclined rotation center XC is inclined with respect to the axial centers 20C and 80C such that the loads applied to the cage 104 in the axial direction from the respective balls 103 are balanced. Accordingly, loads are balanced in the axial direction in a state that all of the balls 103 apply the loads to the cage 104. Therefore, an imbalance of the loads applied to the cage 104 is reduced.

As a result thereof, as far as the sliding protruding spherical surface 41 of the valve plate 40 is made to contact the alignment recessed surface 30b of the cylinder block 30, the cylinder block 30 and the valve plate 40 are constantly kept in a slidable contacting state by mutual alignment action without causing any displacement therebetween. With this structure, an eccentric abutment between the cylinder block 30 and the valve plate 40 is prevented, and a high-speed rotation of the cylinder block 30 can be achieved.

Second Embodiment

In a first embodiment described above, as for an inclination angle of a block-side groove plane 102P and an inclination angle of a drive shaft-side groove plane 101P, those inclined in a same direction mutually have a same value, and in a case where a drive shaft 20 and a cylinder block 30 are rotated around respective axial centers, these inclination angles are set such that loads applied to a cage 104 from seven balls 103 in an axis direction of the cage 104 are balanced. However, a method of setting the inclination angle of the block-side groove plane 102P and the inclination angle of the drive shaft-side groove plane 101P is not necessarily limited thereto.

For example, the inclination angle of the block-side groove plane 102P and the inclination angle of the drive shaft-side groove plane 101P may also be set so as to balance respective rotational moments caused by loads applied to the cage 104 from respective balls 103, that is, rotational moments around the two axes orthogonal to an axial center of the cage 104 and passing an inclined rotation center XC. In the following, a method of setting an inclination angle according to the second embodiment will be described with reference to FIGS. 5 and 6 as appropriate. Meanwhile, since a structure of a bent-axis hydraulic pump motor exemplified in the second embodiment is similar to that of the first embodiment, a detailed description therefor will be omitted by denoting respective components by the same reference signs.

Figure 5:
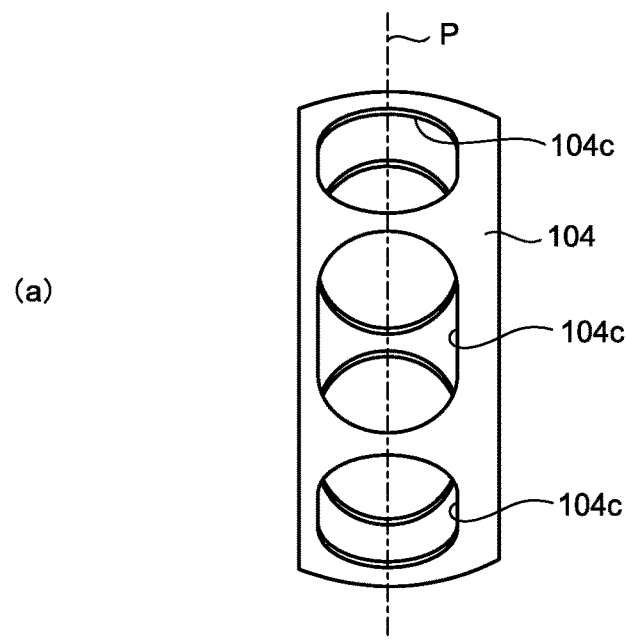
FIG. 5 illustrates a cage applied to a bent-axis pump motor according to a second embodiment of the present disclosure, and part (a) is a side view illustrating a virtual plane P passing a center of a ball hole, and part (b) is a diagram illustrating an X axis and a Y axis set on the virtual plane P.
Figure 5:
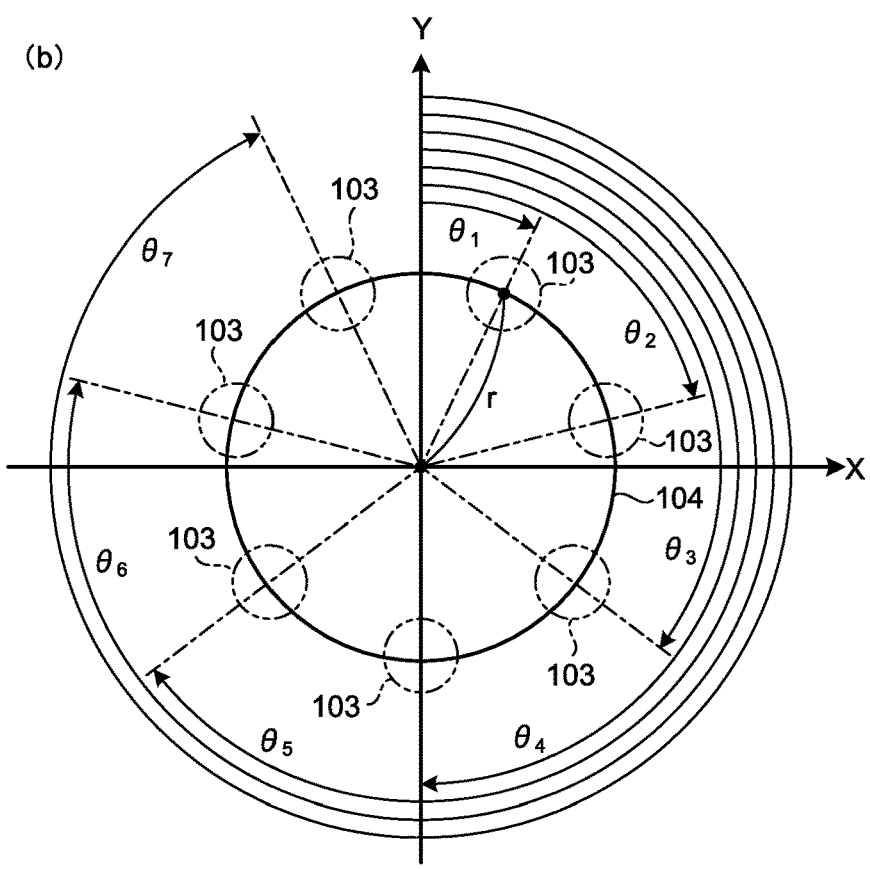
Figure 6:
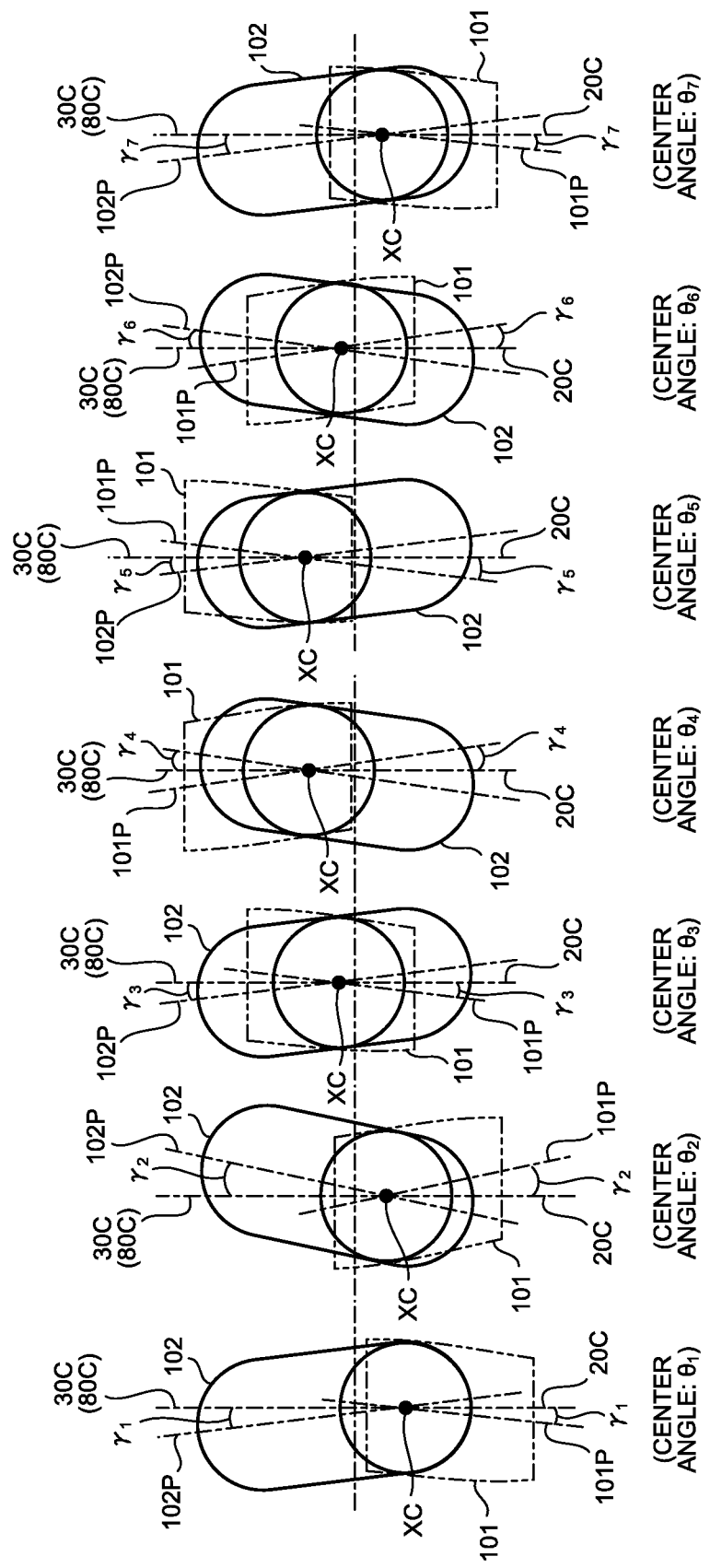
FIG. 6 is a diagram illustrating a relation between a block-side ball groove and a shaft-side ball groove in a constant velocity joint according to the second embodiment.

As illustrated in part (a) of FIG. 5 and part (b) of FIG. 5, an X axis and a Y axis which are orthogonal to an axial center and are mutually orthogonal to a virtual plane P passing through a center of a ball hole 104c are set in the cage 104. The X axis and the Y axis may be set at arbitrary positions. In the following description, for convenience of description, identification numbers are sequentially assigned in clockwise direction starting from the Y axis in part (b) of FIG. 5. In a case where center angles from the Y axis to the center of the ball holes 104c are defined as $\theta_1$, $\theta_2$, $\theta_3$, $\theta_4$, $\theta_5$, $\theta_6$, and $\theta_7$, respectively, inclination angles of block-side groove planes 102P and inclination angles of drive shaft-side groove planes 101P are defined as $\gamma_1$, $\gamma_2$, $\gamma_3$, $\gamma_4$, $\gamma_5$, $\gamma_6$, and $\gamma_7$, and an inclined rotation angle of an axial center 30C of the cylinder block 30 with respect to an axial center 20C of the drive shaft 20 is defined a, a rotational moment balance equation around the X axis will be Equation 1 below, and a rotational moment balance equation around the Y axis will be Equation 2 below.

$$0 = 2\tan\{\gamma_1 - \tfrac{1}{2}\tan^{-1}(\tan\alpha \times \sin\theta_2)\} \times r\cos\theta_2 + 2\tan\{\gamma_2 - \tfrac{1}{2}\tan^{-1}(\tan\alpha \times \sin\theta_2)\} A + 2\tan\{\gamma_7 \tfrac{1}{2}\tan^{-1}(\tan\alpha \times \sin\theta_7)\} \times r\cos\theta_7 \quad (1)$$

$$0 = 2\tan\{\gamma_1 \tfrac{1}{2}\tan^{-1}(\tan\alpha \times \sin\theta_1)\} \times r\sin\theta_1 + 2\tan\{\gamma_2 - \tfrac{1}{2}\tan^{-1}(\tan\alpha \times \sin\theta_2)\} A + 2\tan\{\gamma_7 \tfrac{1}{2}\tan^{-1}(\tan\alpha \times \sin\theta_7)\} \times r\sin\theta_7 \quad (2)$$

What are similar to the first embodiment are: the block-side groove planes 102P adjacent to each other in the circumferential direction and the drive shaft-side groove planes 101P adjacent to each other in a circumferential direction are inclined in directions opposite to each other with respect to respective axial centers 20C and 80C except for one pair; and a block-side groove plane 102P and a drive shaft-side groove plane 101P corresponding to each other are inclined in directions opposite to each other with respect to the axial centers 20C and 80C.

In a case where the inclination angles $\gamma_1$, $\gamma_2$, $\gamma_3$, $\gamma_4$, $\gamma_5$, $\gamma_6$, and $\gamma_7$ are set so as to satisfy the above Equations 1 and 2, a rotational moment around the X axis and a rotational moment around the Y axis caused by loads applied to the cage 104 from the seven balls 103 are balanced respectively. Moreover, each block-side groove plane 102P including an extending axial line of a block-side ball groove 102 and the inclined rotation center XC and each drive shaft-side groove plane 101P including an extending axial line of a shaft-side ball groove 101 and the inclined rotation center XC is inclined with respect to the axial centers 20C and 80C, and therefore, all of the balls 103 apply loads to the cage 104. Therefore, an imbalance of the rotational moments caused in the cage 104 is reduced.

As a result thereof, as far as a sliding protruding spherical surface 41 of a valve plate 40 is made to contact an alignment recessed surface 30b of the cylinder block 30, the cylinder block 30 and the valve plate 40 are constantly kept in a slidable contacting state by mutual alignment action without causing any displacement therebetween. With this structure, eccentric abutment between the cylinder block 30 and the valve plate 40 is prevented, and high-speed rotation of the cylinder block 30 can be achieved.

Meanwhile, in the second embodiment also, the loads applied to the cage 104 from the seven balls 103 in the axis direction of the cage 104 are balanced as far as the inclination angles $\gamma_1, \gamma_2, \gamma_3, \gamma_4, \gamma_5, \gamma_6$, and $\gamma_7$ are set so as to satisfy Equation 3 below in addition to satisfying the above Equations 1 and 2, and as a result, heat generation caused by sliding movement resistance between the cage 104 and a retainer plate 70 and between the cage 104 and a center shaft 80 can be suppressed.

$$0 = 2\tan\{\gamma_1 - \tfrac{1}{2}\tan^{-1}(\tan\alpha \times \sin\theta_1)\} + 2\tan\{\gamma_2 - \tfrac{1}{2}\tan^{-1}(\tan\alpha \times \sin\theta_2)\} + \Lambda + 2\tan\{\gamma_7 - \tfrac{1}{2}\tan^{-1}(\tan\alpha \times \sin\theta_7)\} \quad (3)$$

Meanwhile, the travel hydraulic motor is exemplified in both of the above-described first and second embodiments, but application to a hydraulic motor for a different use other than travel may also be possible. Furthermore, direct application as a bent-axis hydraulic pump may also be possible. Additionally, provided is the structure capable of changing the inclined rotation angle α of the cylinder block 30 with respect to the drive shaft 20, but it is not always necessary to provide such a structure capable of changing the inclined rotation angle.

Figure 7:
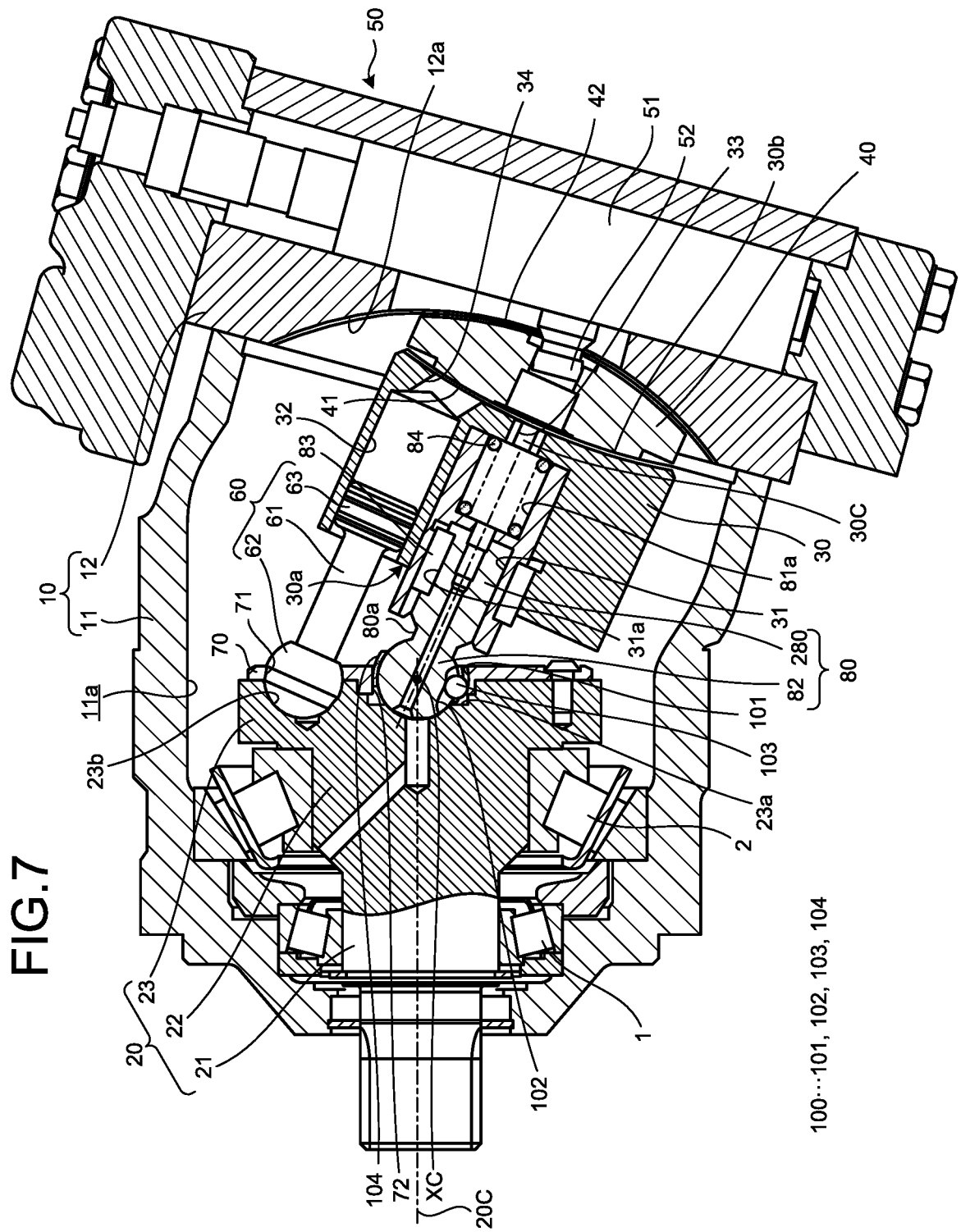
FIG. 7 is a cross-sectional view illustrating a modified example of the bent-axis hydraulic pump motor.

Furthermore, in the above-described first and second embodiments, the shaft attachment hole 31 is formed in the cylinder block 30, and the center shaft 80 separately formed is attached to the shaft attachment hole 31, but the cylinder block 30 and the center shaft 80 may not necessarily be formed separately. Additionally, in a case of forming the cylinder block 30 and the center shaft 80 separately, it is preferable to form the center shaft 80 including an inner shaft 180 and an outer race 280 like a modified example illustrated in FIG. 7. According to this modified example, in a case of applying the outer race 280 having a large diameter, a pressing spring 184 having a large outer diameter may be used without using a member having a large diameter as the inner shaft 180.

Furthermore, in the above-described first and second embodiments, the case where the seven cylinder bores 32 are provided in the cylinder block 30 is exemplified, but the number of cylinder bores 32 may be an odd number such as nine, other than seven. In a case of a bent-axis hydraulic pump motor having nine cylinder bores 32, the number of block-side ball grooves 102 and the number of shaft-side ball grooves 101 are nine in each, or three in each in order to prevent undulation during torque transmission. Meanwhile, the block-side groove planes 102P and the drive shaft-side groove planes 101P of the first embodiment are formed such that inclination angles of those inclined to one side with respect to the axial centers 20C and 80C are equal to each other, and the inclination angles of those inclined in the other direction with respect to the axial centers 20C and 80C are equal to each other, and therefore, the imbalance of loads applied to the cage 104 can be further reduced. However, as far as each block-side groove plane 102P and each drive shaft-side groove plane 101P is inclined, the inclination angles are not limited thereto, and for example, all of groove planes may be inclined at different inclination angles.

Moreover, according to the above-described first and second embodiments, the alignment recessed surface 30b is provided in the cylinder block 30 while the sliding protruding spherical surface 41 is formed on the valve plate 40 so as to cause these components slide over each other, but the cylinder block 30 and the valve plate 40 may be made to slide over each other via a plane.

REFERENCE SIGNS LIST

10 Casing
20 Drive shaft
30 Cylinder block
30a One end surface
30b Alignment recessed surface
31 Shaft attachment hole
32 Cylinder bore
40 Valve plate
41 Sliding protruding spherical surface
42 Sliding protruding cylindrical surface
60 Piston rod
62 Support portion
70 Retainer plate
71 Rod insertion hole
72 Shaft support hole
80 Center shaft
82 Shaft support head
100 Constant velocity joint
101 Shaft-side ball groove
101P Drive shaft-side groove plane
102 Block-side ball groove
102P Block-side groove plane
103 Ball
104 Cage
104a Outer surface
104b Inner surface
104c Ball hole
XC Inclined rotation center
α Inclined rotation angle
β1, β2 Inclination angle
$\gamma_1, \gamma_2, \gamma_3, \gamma_4, \gamma_5, \gamma_6, \gamma_7$ Inclination angle
$\theta_1, \theta_2, \theta_3, \theta_4, \theta_5, \theta_6, \theta_7$ Center angle

The invention claimed is:

1. A bent-axis hydraulic pump motor comprising:
a cylinder block having a center shaft at a position to be an axial center on one end surface, and also having an odd number of cylinder bores which are open along a circumference around the axial center on the one end surface;
a retainer plate inclinably supporting the center shaft to an end surface of a drive shaft; and a constant velocity joint connecting the center shaft to the retainer plate,
wherein, when the drive shaft and the cylinder block are rotated together via the constant velocity joint, a piston rod disposed in each of the cylinder bores is moved at a stroke in accordance with an inclination angle around an inclined rotation center between the drive shaft and the cylinder block,
the constant velocity joint includes:
an inner joint element formed at a support end portion of the center shaft, and having an outer surface on which a number of block-side ball grooves corresponding to a number of the cylinder bores are arranged together along a circumferential direction around an axial center of the center shaft;
an outer joint element formed on the retainer plate at a region facing the support end portion of the center shaft, and having an inner surface on which shaft-side ball grooves corresponding to the block-side ball grooves are arranged together along a circumferential direction around an axial center of the drive shaft;

a plurality of balls interposed between the block-side ball grooves and the shaft-side ball grooves corresponding to each other, and configured to transmit torque between the cylinder block and the retainer plate; and a cage disposed between the inner joint element and the outer joint element and having ball holes configured to house the respective balls in a state in which movement of the balls in the axial direction of the center shaft is regulated, and all block-side groove planes, which include respective extending axial lines of the block-side ball grooves and the inclined rotation center, are inclined with respect to the axial center of the center shaft and all drive shaft-side groove planes, which include respective extending axial lines of the shaft-side ball grooves and the inclined rotation center, are inclined with respect to the axial center of the drive shaft, such that loads applied to the cage in an axial direction from the balls are balanced.

2. The bent-axis hydraulic pump motor according to claim 1, wherein the block-side groove planes adjacent to each other in the circumferential direction are inclined in directions opposite to each other with respect to the axial center of the center shaft except for one pair, the drive shaft-side groove planes adjacent to each other in the circumferential direction are inclined in directions opposite to each other with respect to the axial center of the drive shaft except for one pair, and each block-side groove plane and each drive shaft-side groove plane that correspond to each other, an inclining direction of the block-side groove plane is opposite to an inclination direction of the drive shaft-side groove plane with respect to the axial center of the center shaft and the axial center of the drive shaft.

3. The bent-axis hydraulic pump motor according to claim 2, wherein inclination angles of the block-side groove planes inclined on one side with respect to the axial center of the center shaft are equal to each other, inclination angles of the drive shaft-side groove planes inclined on the one side with respect to the axial center of the drive shaft are equal to each other, inclination angles of the block-side groove planes inclined on the other side with respect to the axial center of the center shaft are equal to each other, and inclination angles of the drive shaft-side groove planes inclined on the other side with respect to the axial center of the drive shaft are equal to each other.

4. The bent-axis hydraulic pump motor according to claim 1, wherein the outer surface of the inner joint element and the inner surface of the outer joint element are each formed in a spherical shape centering the inclined rotation center, and a curvature center of the block-side ball grooves and a curvature center of the shaft-side ball grooves are aligned with the inclined rotation center.

5. The bent-axis hydraulic pump motor according to claim 1, wherein the center shaft and the cylinder block are formed separately, and a shaft attachment hole is formed in the cylinder block, and the center shaft is attached to the shaft attachment hole in a state in which the support end portion protrudes from the one end surface.

6. The bent-axis hydraulic pump motor according to claim 1, further comprising a valve plate interposed between another end surface of the cylinder block and a casing, and configured to perform pressure switch control for each of the cylinder bores in accordance with a rotational position of the cylinder block by slidably contacting the cylinder block in a rotatable manner, wherein the valve plate contacts the another end surface via a spherical surface having a center on extension of the axial center of the cylinder block.

7. A bent-axis hydraulic pump motor comprising:

a cylinder block having a center shaft at a position to be an axial center on one end surface, and also having an odd number of cylinder bores which are open along a circumference around the axial center on the one end surface;

a retainer plate inclinably supporting the center shaft to an end surface of a drive shaft; and a constant velocity joint connecting the center shaft to the retainer plate, wherein, when the drive shaft and the cylinder block are rotated together via the constant velocity joint, a piston rod disposed in each of the cylinder bores is moved at a stroke in accordance with an inclination angle around an inclined rotation center between the drive shaft and the cylinder block, the constant velocity joint includes:

an inner joint element formed at a support end portion of the center shaft, and having an outer surface on which a number of block-side ball grooves corresponding to a number of the cylinder bores are arranged together along a circumferential direction around an axial center of the center shaft;

an outer joint element formed on the retainer plate at a region facing the support end portion of the center shaft, and having an inner surface on which shaft-side ball grooves respectively corresponding to the block-side ball grooves are arranged in parallel in a circumferential direction centering an axial center of the drive shaft;

a plurality of balls interposed between the block-side ball grooves and the shaft-side ball grooves corresponding to each other, and configured to transmit torque between the cylinder block and the retainer plate; and a cage disposed between the inner joint element and the outer joint element and having ball holes configured to house the respective balls in a state in which movement of the balls in the axial direction of the center shaft is regulated, and all block-side groove planes, which include respective extending axial lines of the block-side ball grooves and the inclined rotation center, are inclined with respect to the axial center of the center shaft and all drive shaft-side groove planes, which include respective extending axial lines of the shaft-side ball grooves and the inclined rotation center, are inclined with respect to the axial center of the drive shaft, such that rotational moments caused by loads applied to the cage from the balls, namely, rotational moments around two axes orthogonal to an axial center of the cage and passing the inclined rotation center are balanced.

* * * * *